United States Patent [19]

Triebel et al.

[11] 4,201,828
[45] May 6, 1980

[54] IMPACT RESISTANT SAFETY GLASS PANEL

[75] Inventors: Wolfgang Triebel, Hanau; Siegfried Hari, Klein-Welzheim; Hubert Koert, Hanau, all of Fed. Rep. of Germany; Fritz Evers, Mauritz-Lindenweg 33, 44 Münster, Fed. Rep. of Germany

[73] Assignees: Deutsche Gold- und Silber-Scheideanstalt vormals Roessler, Frankfurt am Main; Fritz Evers, Münster, both of Fed. Rep. of Germany

[21] Appl. No.: 912,280

[22] Filed: Jun. 5, 1978

Related U.S. Application Data

[63] Continuation of Ser. No. 677,640, Apr. 16, 1976, abandoned.

[30] Foreign Application Priority Data

Apr. 16, 1975 [DE] Fed. Rep. of Germany ....... 2516629

[51] Int. Cl.$^2$ .................... B32B 27/38; B32B 17/10
[52] U.S. Cl. .................... 428/332; 428/412; 428/442; 428/451
[58] Field of Search ............... 428/412, 430, 441, 442, 428/521, 522, 215, 914, 332, 451; 526/432, 377, 320, 319, 328

[56] References Cited

U.S. PATENT DOCUMENTS

| 2,231,471 | 2/1941 | Hill | 428/422 |
| 2,754,280 | 7/1956 | Brown et al. | 526/317 |
| 3,666,614 | 5/1972 | Snedeker et al. | 428/412 |
| 3,919,440 | 11/1975 | Takahashi et al. | 428/422 |

Primary Examiner—Marion E. McCamish
Assistant Examiner—R. Eugene Varndell, Jr.
Attorney, Agent, or Firm—Beveridge, DeGrandi, Kline & Lunsford

[57] ABSTRACT

Impact resistant glass laminates formed of at least one silicate glass panel and at least one polycarbonate panel bonded together by a methacrylate resin formed from at least 50% by weight of the polymerizable mixture of 2-ethylhexyl methacrylate.

10 Claims, No Drawings

IMPACT RESISTANT SAFETY GLASS PANEL

This is a continuation of application Ser. No. 677,640, filed Apr. 16, 1976, now abandoned, which is relied on and incorporated herein.

The present invention relates to safety glass panels, also known as laminated glass panels, formed of at least one silicate glass panel and at least one polycarbonate panel. These laminated panels are impact resistant.

Impact resistant glass and more especially the so-called bulletproof panes of safety glass have been known in the past. For instance, in German utility patent 1,950,547 there is described a structure wherein at least one relatively thick pane or panel of thermoplastic plastic, for example, polycarbonate is disposed between two thinner coverpanes or exterior panels made of silicate glass. In the case of this safety glass construction, the exterior panel on the side away from the impact, consists of a panel of silicate glass which is chemically tempered (prestressed), and the individual panels are connected by soft adhesive layers which act to dampen the fracture stresses transmitted through the panels.

Furthermore, safety glasses have been known, in the past which consist of a panel of about 2 to 6 mm thickness of a highly molecular thermoplastic polycarbonate, such as dihydroxydiaryl-alkanes, which is covered on one side with a mineral glass plate of at most 1.5 mm thickness (DAS 1,297,832). The individual panels are connected by an adhesive layer of polyvinyl butyral, epoxy resin, silicone resin or polyester resin. The panels or laminated glass are intended to be used for providing the glass or "lights" of vehicles for roads or rails and are positioned and effectively secured in place with their glass-side facing the exterior of the vehicle. However, these laminated glass panes are not sufficiently resistant to impact and have a number of drawbacks.

Furthermore, panels of laminated glass have been described in an application of addition to the German published application AS 1,297,832 (German AS 1,496,508) wherein a polycarbonate plate is used which is more than 6 mm thick and the glass panel is more than 1.5 mm thick. The laminated panels are said to be bullet proof when the thickness of the plastic panel is at least 8 to 10 mm. However, in order to be bullet proof against projectile such as armor-piercing bullet of 9 mm caliber, the thickness of the polycarbonate panel must be 25 mm.

At the present the following are the requirements for "bulletproof" glass:

1. Glass for Bank Windows-Impact Resistant Against Hand Guns up to a Caliber of 357 Magnum.
   Armor Plate glass: 4 layers with 7 mm thick glass panes, overall thickness 28 mm, weight 70 kg/m$^2$
   Acrylic glass: 1 layer, overall thickness 50 mm, weight 60 kg/m$^2$ 2. Impact Resistant Glass Against Long Range Guns up to Caliber G-3 (NATO-rifle).
   Armor plate glass: 8 layers with 7 mm thick glass panes, over all thickness 56 mm, weight 140 kg/m$^2$
   Acrylic glass: 1 layer, overall thickness 200 mm, weight 240 kg/m$^2$ For clearance as a "bulletproof" glass in the sense of the degree of protection required for use in the glass of bank windows and bank tellers' windows it is necessary that a panel the size of 50×50 cm withstand minimum of 3 shots.

It is accordingly, an object of the invention to provide an impact resistant safety glass panel, with an impact resistance that is sufficient to meet the above requirements and which is thinner and lighter than the standard armor plate glass or acrylic glass. The present invention enables thinner and lighter panels to be used in a wider application than the panels of the prior art. The present invention also facilitates handling of the laminated glass panels.

According to the present invention, one feature of the invention resides in an impact resistant safety glass laminate formed of at least one silicate glass panel or layer and at least one polycarbonate panel or layer, and which is further characterized in that one silicate glass panel is of at least 6 mm in thickness and is disposed on the side of the laminate exposed to the potential impact. It is a further feature of the invention that the silicate lamina and the polycarbonate lamina are bonded to each other by means of a cured methacrylic resin, which is derived to at least 50% by weight, based on the total weight of the resin, from 2-ethylhexylmethacrylate.

Still a further feature of the present invention resides in providing as one member of the laminate a polycarbonate panel of at least 1.5 mm thickness.

The silicate glass panel or lamina, disposed or positioned on the side of the laminate facing the potential impact must be at least 6 mm thick. The use of individual panels made of silicate glass of more than about 12 mm thickness is impracticable. Insofar as the requirements call for a thicker layer of silicate glass, it will generally be more advantageous to use a safety glass of several silicate glass laminae. A safety glass formed of 2 laminae of silicate glass, each 12 mm in thickness to provide a total thickness amount to 24 mm, should satisfy all requirements.

The polycarbonate lamina or panel combined with the silicate glass panel is to be 1.5 to 5 mm, preferably 2 to 4 mm. thick.

The silicate glass panel and the polycarbonate panel are bonded to each other by an adhesive layer of effectively at least 0.1 mm, preferably at least 0.5 mm thickness. The upper limit for the thickness of the adhesive layer is governed by economic factors, and is about 5 mm, preferably about 3 mm. The adhesive or bonding layer consists of a cured methacrylate resin which is derived to at least 50% by weight, based on the totat weight of the resin, of 2-ethylhexyl methacrylate as the monomer.

It is particularly advantageous to produce the adhesive layer by curing a methacrylate syrup, which consists of (a)
50 to 80% by weight of 2-ethylhexlmethacrylate,
10 to 40% by weight of 2-ethylhexyl acrylate,
0 to 5% by weight of other alkyl esters of the acrylic and/or methacrylic acid,
0.1 to 3% by weight of acrylic and/or methacrylic acid and "possibly"
5 to 30% by weight of 2-hydroxypropyl acrylate, whereby at least a part of the monomers exist to such an extent in polymer form that the viscosity of the finished syrup at +20° C. lies between 10 and 1000 cp.
(b)
0.1 to 0.6% by weight of glycol dimercapto acetate,
(c)
5 to 20% by weight of ethyl tributyl citrate and
(d)

0.1 to 3% by weight of at least one multivalent ester of the methacrylic acid,
whereby all quantitative data are based on the weight of the finished syrup.

The syrup of methacrylate adhesive is inserted between the two laminae or panels that are to be bonded together in accordance with known techniques and are cured by a cold hardening catalyst system in a known manner. A combination of small quantities, for example, 1 ppm of Cu++ - ions (added as cooper naphtenate) and of a hardener liquid, consisting of a solution of at least one alkylacyl peroxide and at least one compound which contains a labile halogen atom, preferably a chlorine atom, in a viscous vehicle such as a plasticizing agent or viscous solvent is particularly preferred as a catalyst system. Representative hardeners have been described extensively in the German Pat. No. 1,146,254. They consist for example of a solution of β-phenyl ethyl dibutyl amino hydrochloride and tertiary butyl perbenzoate in dimethylphthalate and are used in quantities of 0.5 to 2% by weight, preferably of about 1% by weight, related to the weight of the methacrylate syrup.

The curing should take place effectively at a temperature between +15° and +35° C., preferably between +20° and +30° C.

In order to protect the polycarbonate panel also on its reverse side against scratching it can be covered with or bonded to a second, generally thinner, silicate glass pane similar to that disposed on the side of potential impact. However, it is likewise possible to provide the reverse side of the polycarbonate panel with a clear-transparent, scratch resistant coating of only a few micron thickness. This additional protective coating can be accomplished for example in a known manner by vaporization of mineral substances, such as silicon monoxide or dioxide, or metallic oxides or fluorides onto the surface of the polycarbonate panel.

As compared to known impact resistant glass systems, a considerable savings in overall thickness and weight at the same impact resistance will be achieved by the safety glass according to the invention. As a result of that, new possibilities of construction are opened up and the use of impact resistant glass will be extended to areas where it was heretofore considered too costly or too heavy.

A safety glass according to the invention, with a silicate glass pane of 6 mm thickness, an adhesive layer of 1 mm thickness and of a polycarbonate pane of 2 mm thickness is resistant to impact by a 9 mm Parabellum. By comparison, a combination laminate glued together with polyvinylbutyral, of 2 mm silicate glass and 6 mm polycarbonate is easily pierced from both sides.

A safety glass panel with silicate glass panels of 10 mm thickness, an adhesive layer of 1 mm thickness and a polycarbonate panel of 2 mm thickness is resistant against a 357 magnum caliber. The overall thickness amounts to only 13 mm and the weight to only 20 kg/m$^2$. A 30 mm thick polycarbonate panel or a 25 mm thick silicate glass panel on the contrary are pierced easily, likewise a combination glued together with polyvinylbutyral of 2 mm silicate glass and 10 mm polycarbonate is easily pierced no matter from which side the shot is fired.

A safety glass according to the invention with a silicate glass panel of 12 mm thickness, an adhesive layer of 1 thickness and a polycarbonate panel of 3 mm thickness is bulletproof against a 44 caliber magnum. A combination of a 3 mm silicate glass panel and a 12 mm polycarbonate panel on the other hand is pierced easily by bullets from either side.

A safety glass panel with a commercial laminated glass panel of 2 sheets of 12 mm silicate glass, an adhesive layer of 1 mm thickness and a polycarbonate panel of 4 mm thickness is bulletproof against a G3 caliber. The overall thickness amounts to only about 30 mm and the weight to only 50 kg/m$^2$. A 50 mm thick polycarbonate panel by comparison is pierced easily. Similarly a 35 mm thick armor plate glass panel of 5 layers of silicate glass is pierced easily. Even a laminate formed of a 4 mm silicate glass panel and a 24 mm polycarbonate panel is pierced easily by bullets from either side.

We claim:

1. Impact resistant glass laminate comprising a silicate panel and a polycarbonate panel, said silicate glass panel being of at least 6 mm in thickness and disposed on the side of the laminate subject to a potential impact and wherein the glass panel is bonded to said polycarbonate panel of at least 1.5 mm in thickness by means of a methacrylate resin cured in situ between said panels, and said resin being formed from at least 50% by weight, based on the total weight of the resin, of 2-ethylhexyl methacrylate.

2. Impact resistant glass as set forth in claim 1, wherein said polycarbonate panel is 2 mm in thickness.

3. Impact resistant glass as set forth in claim 1, wherein said silicate glass panel is 10 mm in thickness and said polycarbonate panel is 2 mm in thickness.

4. Impact resistant glass as set forth in claim 1, wherein said silicate glass panel is 12 mm in thickness and said polycarbonate panel is 3 mm in thickness.

5. Impact resistant glass as set forth in claim 1, wherein a laminate of 2 silicate glass panels each 12 mm in thickness is bonded to one polycarbonate panel of 4 mm in thickness.

6. Impact resistant glass as set forth in claim 1 wherein said polycarbonate panel is coated on its reverse side against scratching by a thinner silicate panel or a thin scratch resistant coating.

7. Impact resistant glass as set forth in claim 1 wherein the thickness of said silicate glass panel is from 6 to 12 mm, the thickness of said polycarbonate panel is from 1.5 to 5 mm and the thickness of said resin is from 0.1 to 5 mm.

8. Impact resistant glass laminate comprising a silicate glass panel and a polycarbonate panel, said silicate glass panel being of at least 6 mm in thickness and disposed on the side of the laminate subject to a potential impact and wherein the glass panel is bonded to said polycarbonate panel of at least 1.5 mm in thickness by inserting a methacrylate syrup between said panels and curing said syrup to form a cured resin, said resin being formed from at least 50% by weight, based on the total weight of the resin, of 2-ethylhexyl methacrylate.

9. Impact resistant glass laminate comprising a silicate glass panel and a polycarbonate panel, said silicate glass panel being of at least 6 mm in thickness and disposed on the side of the laminate subject to a potential impact and wherein the glass panel is bonded to said polycarbonate panel of at least 1.5 mm in thickness by inserting a methacrylate syrup between said panels and curing said syrup at a temperature between 15° C. and 35° C. to form a resin adhesive to bond said panels together, said resin being formed from at least 50% by weight, based on the total weight of the resin, of 2-ethylhexyl methacrylate.

10. Impact resistant glass laminate comprising a silicate glass panel and a polycarbonate panel, said silicate glass panel being of at least 6 mm in thickness and disposed on the side of the laminate subject to a potential impact and wherein the glass panel is bonded to said polycarbonate panel of at least 1.5 mm in thickness by curing of a methacrylate syrup which is insearted between said panels, the said syrup consisting of at least 50% by weight, based on the total weight of said syrup, of 2-ethylhexyl methacrylate.

* * * * *